FIG. 1

INVENTOR.
Bradford Lyttle
BY
Louis Sheldon
Att'y

Nov. 1, 1955     B. LYTTLE     2,722,286
CRANKCASE OIL LEVEL MAINTAINING MEANS
Filed March 29, 1954     4 Sheets-Sheet 2

INVENTOR.
Bradford Lyttle
BY
Louis Sheldon
Att'y

Nov. 1, 1955 — B. LYTTLE — 2,722,286
CRANKCASE OIL LEVEL MAINTAINING MEANS
Filed March 29, 1954 — 4 Sheets-Sheet 3

INVENTOR.
Bradford Lyttle
BY
Louis Sheldon
Att'y

Nov. 1, 1955  B. LYTTLE  2,722,286
CRANKCASE OIL LEVEL MAINTAINING MEANS
Filed March 29, 1954  4 Sheets-Sheet 4

INVENTOR.
Bradford Lyttle
BY
Louis Sheldon
Att'y

United States Patent Office 2,722,286
Patented Nov. 1, 1955

2,722,286

CRANKCASE OIL LEVEL MAINTAINING MEANS

Bradford Lyttle, Chicago, Ill.

Application March 29, 1954, Serial No. 419,393

20 Claims. (Cl. 184—103)

This invention relates to liquid level maintenance, and is concerned more particularly with the level of oil in the crankcases of motor vehicle and the like internal combustion engines.

It is an object of the invention to provide improved means for automatically maintaining the crankcase oil at the normal level.

Another object is to provide for the automatic maintenance of the crankcase oil of an automobile at normal level for thousands of miles without attention.

A further object is to provide for the automatic pumping of oil into an automobile crankcase to raise it to the normal level when the oil in the crankcase subsides below normal level.

An additional object is to provide a novel and simple float-operated mechanism operative upon fall of oil in the crankcase from normal level to render operative a pump for adding oil to the crankcase.

It is also an object to provide a novel, simple and durable pumping mechanism involving a minimum of moving parts for replenishing a crankcase with oil.

It is another object to provide means operative pursuant to drop in crankcase oil level from normal to pump oil to the crankcase until the oil level is normal.

Further objects and advantages of the invention will appear as the description proceeds.

The invention will be better understood upon reference to the following description and accompanying drawings, in which.

Referring now more particularly to the drawings, disclosing illustrative embodiments of the invention, there is shown at 10 an internal combustion engine of an automobile or the like having an intake manifold 12 equipped with a vacuum connector 14, a crankcase 16 having an oil filler hole 18 for which a removable breather cap 20 is provided, and an oil dip stick hole 22.

In accordance with the illustrated forms of the invention, briefly, whenever the crankcase oil level drops below the normal or optimum (or what is generally called the "full") level, and the engine is running, a circuit closes, rendering a pump operative to deliver oil to the crankcase; and when the normal level becomes re-established, the circuit opens and the pump is stopped.

The invention involves preferably a metal or other suitable preferably stiff tube 24 (Figs. 1 and 2) which takes the place of the usual dip stick. The dip tube 24 has a side hole 26 near its bottom 28, and may be provided with a collar 30 which may be fixed as by a set screw 32 in such position as to limit the extent of insertion of the tube so that, when the tube is fully inserted, the crankcase oil, when at normal level, will cover the hole as indicated at 34, and, when the oil level is below the top of the hole, as indicated at 36, said level is sub-normal. The upper end of the dip tube 24 is coupled as by flexible or other tubing 38 to a float tank.

In one form of the invention (Figs. 1 and 2), the flexible tubing 38 is connected to a tubular connector 39 depending from the bottom 40 of the body 42 of a tank 44 containing a float 46 guided as by a rod 48 fixed to the body. A switch 50 is arranged to be closed when the float 46 has fully descended, as indicated in dot-dash lines at 51, and may comprise a spring arm 52 which may be grounded and anchored at one end as at 54 to the tank body 42 and provided at its other end with a contact tip 56 over and cooperating with a stationary contact 58 in the form of a binding post insulated as at 60 from and anchored to the tank body bottom 40. A tubular projection 64, characterized by a fine orifice 66, extends preferably from the top 68 of the tank body 42 and is adapted to be coupled with the intake manifold 12.

A vacuum-breaker valve 72 (Figs. 1 to 4) which opens to the atmosphere is provided to prevent crankcase oil from being drawn into the intake manifold. The valve 72 is located at the upper end of the tank 44 and comprises a sleeve 74 affording at the top thereof a seat 76 engageable by the leather-bottomed or other suitable head 78 of a movable valve member 80 biased by a spring 82, held in place by a bracket 83, the stem 84 of said member extending down within and projecting substantially below the sleeve, as indicated at 86, when the valve is closed. The lower portion of the sleeve 74 is preferably of relatively reduced bore 88 to serve as a guide for the valve stem 84, and the upper portion of the sleeve has an enlarged bore 90 and is formed with one or more holes 92 to enable the atmospheric air, when the valve 72 is open, to move rapidly into the interior of the tank body 42.

The switch 50 controls a pump, one form being generally indicated at 94 (Figs. 1, 5 and 6), and, to that end, a wire 96 connects the binding post 58 to a binding post 98 insulated as at 100 from an anchored to a brass or other suitable compartment 102 connected to the side 104 of the body 106 of a pump tank 108, the post 98 being one of the insulated terminals of a solenoid 110 (see also Fig. 7) controlled by the switch and mounted in the compartment in spaced relation to the top 112 and bottom 114 of the compartment. A non-magnetic bushing 116 for the solenoid core or armature 118 extends throughout the height of the compartment 102, and upper and lower conduits 120 and 122 intersect the bushing and the side wall 124 of the compartment, the upper conduit being open to the atmosphere, the lower conduit having a restricted orifice 126 and adapted to be connected to the intake manifold 12. The upper part of the side wall 104 of the tank body 106 has a hole 128 leading to the interior of the compartment 102 above the solenoid 110, and the bushing 116 is formed with one or more holes 130 adjacent the top thereof and with one or more holes 132 adjacent the bottom thereof, the several holes 130 and 132 communicating with the hole 128.

A compartment 136 may be mounted on the top 138 of the tank body 106 so as to overhang the same, the overhanging portion having a depending connector sleeve 140 coupled as by flexible tubing 142 to an aluminum or other suitable tube 144 extending rearward along the underside of the vehicle body and through a hole 146, which may be punched or otherwise formed in the vehicle body, and into the trunk compartment 148. Here the tube 144 is coupled by a section of flexible tubing 150, preferably transparent so that the presence of oil therein is discernible, to a second aluminum or other suitable tube 152 extending down through a punched hole in the cap 154 of an oil reservoir 156 which may be a readily purchaseable filled crankcase oil can of any suitable capacity, say about ten quarts, more or less, the tube 152 terminating adjacent the bottom of the can, and the cap having an air hole punched therein, or the cap being loosely screwed, so that air may enter the can as oil escapes therefrom through the tube immersed therein. The can 156 may be removably held erect and secure by any suitable means, as for example by being seated in and strapped as at 158 to a cradle 160 mounted as by screws (not shown) on the floor 162 of the trunk compartment 148.

The sleeve 140 also may be part of an oil intake valve 172 and to this end affords at its upper end a seat 174 for a valve element 176 biased toward the seat as by a spring 178 whose pressure may be adjusted by a screw 180 threaded in a nut 182 secured to the compartment 136 and held in adjusted position as by a lock nut 184. Or, when a spring of the desired pressure is selected, the adjusting means may be dispensed with. The compartment 136 is open over a hole 186 in the tank body top 138 and thus communicates with the interior of the tank body 106.

The pump tank body 106 contains a float 190 guided as by a rod 192 fixed to the body, the float being preferably cushioned at the bottom as by a spring 194 and operative, as will appear, to trip a vacuum-breaker valve 196 which opens to the atmosphere and is located at the top 138 of the body. The valve 196 accordingly may be identical or substantially identical with the valve 72.

A cup 198 is secured to and below the bottom 200 of the tank body 106, said bottom having a hole 202 over the cup. A sleeve 204 secured in said bottom 200 over the cup 198 affords at the upper end thereof a seat 206 on which the plate 208 of a check valve 210 is adapted to rest. The valve plate 208 is located within a cap 212 secured within the tank body 106 and to the tank body bottom 202. Within the cap 212 is secured a partition 214 confining the plate to positions from which it can gravitate into proper closing position on the valve seat 206. The partition 214 is perforated as at 216 to establish communication between the cup 198 and the cap 212 when the valve 210 is open. A sleeve 220 secured to the tank body bottom 200 leads from the interior of the cap 212 and is coupled by a flexible tube 222 (Fig. 1) to an aluminum or other suitable tube 224 passing down through a hole 226 punched or otherwise formed in the oil filler breather cap 20.

Figure 1:
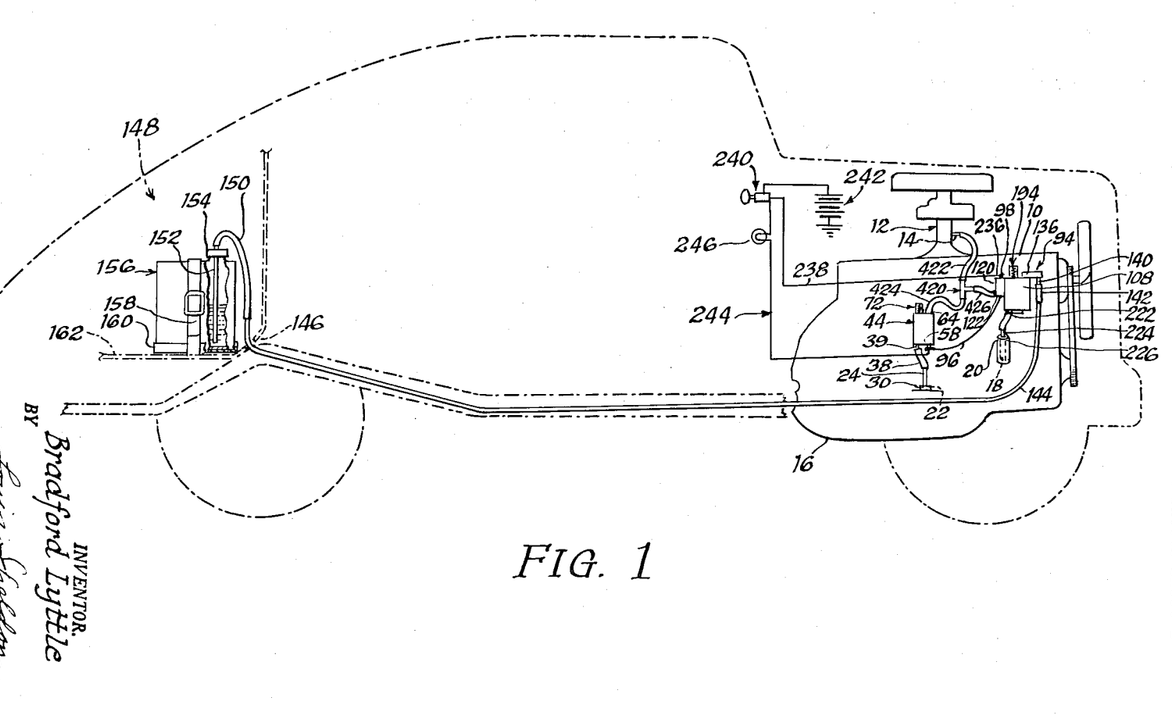
Fig. 1 is an elevational view, partly diagrammatic, showing one form of the invention employed in an automobile.
Figure 7:
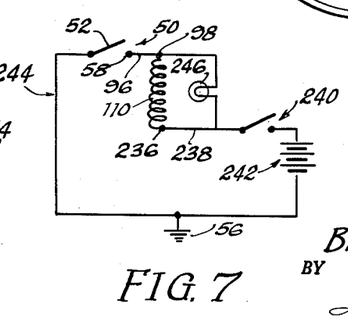
Fig. 7 is a diagram of a form of electric circuit adapted for use with a solenoid-controlled pump.

The second insulated terminal 236 of the solenoid 110 is connected by a conductor 238 to the ignition switch 240 and thence to the battery 242, as is clear from the electric circuit 244 (Figs. 1 and 7). If desired, a tell-tale light 246 may be connected in parallel with the solenoid 110 and preferably located on the dashboard or elsewhere in the view of the driver.

The operation is as follows:

Assume that the apparatus has just been installed, with the oil in the crankcase 16 at the normal level, indicated at 34 (Fig. 2), which is just above the top of the dip tube hole 26, the float 46 down so that the switch 50 is closed, the ignition switch 240 open so that the solenoid circuit is open and thus the solenoid core 118 is down.

Now upon the closing of the ignition switch 240, the solenoid circuit 244 becomes closed, with the result that the core 118 is raised, but nothing further happens until the engine 10 is started. When the engine 10 is now started, air is drawn from the pump tank 108 through the tank hole 128 and down past the solenoid 110 and through the lower bushing holes 132 and connector 122 to the intake manifold 12, the suction thereby opening the oil intake valve 172 against the resistance of the spring 178 and drawing oil from the reservoir 156 but at the same time holding the plate valve 208 closed so that none of that oil may escape at such time from the pump tank to the crankcase 16, and thus oil commences to collect in the pump tank, the vacuum-breaker valve 196 remaining closed. At the same time, air is drawn from the dip tube 24 and switch tank body 42 through the orifice 66 to the intake manifold 12, and thus oil is drawn from the crankcase 16 up the dip tube and commences to collect in the switch tank body, the switch tank vacuum-breaker valve 72 remaining closed. The oil collecting in the switch tank body 42 eventually raises the float 46 sufficiently to permit the switch arm 52 to spring up out of engagement with the contact 58 and thus open the switch 50, thus opening the circuit 244 to thereby de-energize the solenoid 110, whereupon the core or armature 118 drops, unblocking the upper bushing holes 130 and the atmospheric air passage 120 and blocking the lower bushing holes 132 and the conduit 122, so that the vacuum in the pump tank 108 is broken by atmospheric air entering through the passage 120, bushing holes 130 and tank hole 128, and thus the oil intake valve 172 is sprung closed and the oil in the pump tank gravitates through the hole 202 and cup 198, opens the plate check valve 210 and passes through the partition holes 216 and down the connector sleeve 220 and tubing 222 and 224 and into the oil filler hole 18 to the crankcase 16. The float switch 50 and hence the circuit 244 is opened so soon after the engine starts that only a negligible quantity of oil will have been drawn from the reservoir 156 and delivered to the crankcase 16, so that the crankcase oil level will not be appreciably raised.

The suction from the intake manifold 12 continues in effect on the switch tank 44, however, so that oil continues to accumulate in that tank and to raise the float 46. Eventually, the top of the float 46 engages the bottom 86 of the movable element 80 of the vacuum-breaker valve 72, and proceeds to raise said element and thus open the valve and admit atmospheric air to the switch tank 44 to thereby break the vacuum in the tank, whereupon the oil and float in the tank proceed to descend by gravity, and this descent continues until the vacuum-breaker valve 72 again closes. Thus there is an intermittent opening and closing of the valve 72 so that the float 46 hovers substantially in the position shown in dash lines at 250 in Fig. 2, and this condition prevails so long as the crankcase oil remains at normal level. As the float 46 hovers, a small quantity of oil alternately descends into and is drawn up from the crankcase 16. The quantity of oil drawn from the crankcase 16 to fully raise the float 46 is so slight as to have no appreciable lowering effect on the level of the oil in the crankcase. The valve 72 thus functions to preclude oil from being drawn into the intake manifold 12.

As the engine 10 runs and thus uses up some of the oil from the crankcase 16, the oil level in the crankcase will eventually dip below the top of the dip tube hole 26. When this occurs, the intake manifold suction on the switch tank 44 draws atmospheric air from the crankcase 16 through the tube hole 26 and up the tube 24 to the upper part of the tank over the float 46, allowing the oil to flow from the tank and tube back into the crankcase and thus allowing the float to descend, but, as indicated above, this quantity of oil is too small to raise the crankcase oil level sufficiently to cover the tube hole. When the float 46 has reached its lowermost position and thus closed the switch 50 and consequently the solenoid circuit 244, the core 118 is raised and, as recited above, the intake manifold suction becomes effective to draw oil from the reservoir 156 into the pump tank 108, where the oil accumulates and raises the pump float 190, the top of which eventually opens the vacuum breaker valve 196, permitting atmospheric air to be drawn into the tank by the intake manifold suction and stopping the oil intake. The oil in the pump tank 108 now gravitates into the crankcase to replenish the same as noted above and this flow continues until the pump float 190 has descended sufficiently to allow the vacuum breaker valve 196 to close, and, when this occurs, the resulting vacuum stops this descent and commences to draw additional oil from the reservoir 156 to the pump tank. This cycle is repeated automatically until the crankcase oil covers the dip tube hole 26, whereupon the suction applied to the switch tank 44 again becomes effective to draw oil from the crankcase into said tank and raise the float 46 to allow the switch 50 to open and thus open the solenoid circuit 244, whereupon the solenoid core 118 drops and thus breaks the vacuum in the pump tank 108 so that substantially all of the oil then in the pump tank flows to the crankcase. The float 46 continues to rise until it reaches a position of substantial equilibrium, as noted above.

The switch float 46 is held stationary by the spring pressure and manifold suction on the valve element 80 as the oil continues to rise in the switch tank 44, until the oil has risen to such an extent that the buoyant force on the float overbalances the closing forces on the valve element, whereupon the float rises suddenly, popping the valve 72 open, the resultant rush of atmospheric air through the valve breaking the vacuum in the tank. Now the oil and float 46 proceed to descend in the tank 44 and this descent continues until the valve 72 closes, and then the cycle is repeated.

The pump float 190 operates similarly to pop the spring pressed valve 194 open, so that a substantial quantity of oil is delivered to the crankcase 16 in each cycle of opening and closing of said valve.

A somewhat more compact solenoid-operated float pump is shown at 260 in Figs. 8 to 12. In the pump 260, which operates like the pump 94, the solenoid 262 is located inside the tank 264, with its armature 266 extending horizontally and surrounded by a non-magnetic bushing 268 extending across the interior of the tank. The suction conduit or connector 272 has a reduced orifice 274 and communicates with and extends upward from one end portion of the bushing 268 and through the top 276 of the tank 264, and the conduit 278, which is open to the atmosphere, communicates with and extends upward from the other end portion of the bushing. The bushing end portions are perforated as at 280 and 282, respectively, and it will now be apparent that when the solenoid 262 is energized, the armature 266 uncovers the hole 280 and the inner end of the suction conduit 272 and blocks the inner end of the air conduit 278 and the hole 282 against the resistance of the spring 284, and when the solenoid is de-energized, the spring moves the armature to uncover the hole 282 and the inner end of the air conduit and block the inner end of the suction conduit and the hole 280.

Figure 8:
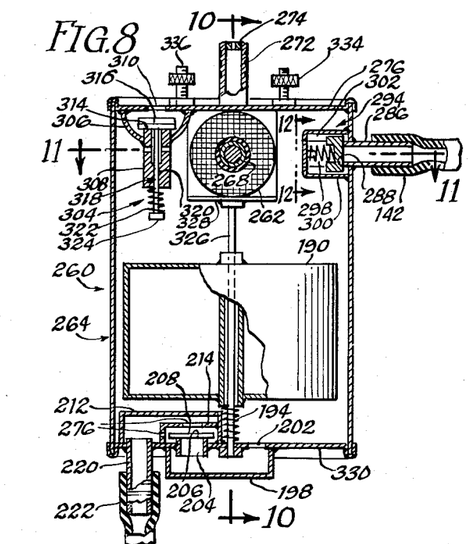
Fig. 8 shows a modification of Fig. 5.
Figure 10:
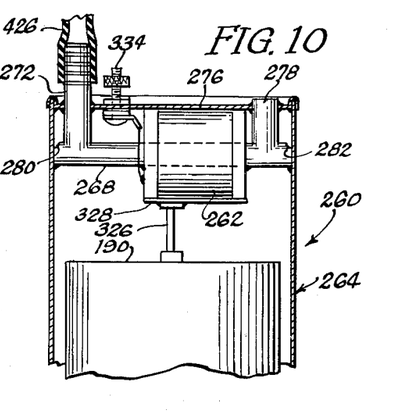

The oil inlet connector tube 286 is secured to and projects into the tank 264 to provide a seat 288 for the spring-pressed movable element 290 of a check valve 294 having a spring 298 for which a guide and retainer bracket 300, open as at 302 to the interior of the tank, is provided.

The vacuum breaker valve may be like that shown at 196, but if mounted within the pump tank 264 it may take the form shown at 304, supported as by a dished member 306 secured to a sleeve 308 and the tank top 276, the tank top being perforated as at 310 to establish communication between the atmosphere and the interior of said member. The sleeve is perforated as at 312 and at its top serves as a seat 314 for the leather-bottomed or the like head 316 of a valve element 318 whose stem 320 is guided by the sleeve 308. A spring 322 confined between the sleeve 308 and the headed bottom 324 of the stem 320 biases the head 316 toward the seat 314.

Figure 5:
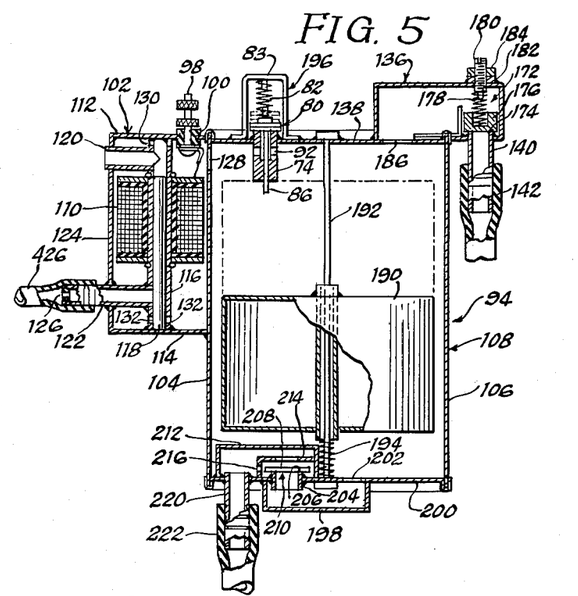
Fig. 5 is a vertical view, partly in section and partly in elevation, of a solenoid-controlled pump in accordance with one form of the invention.
Figure 6:
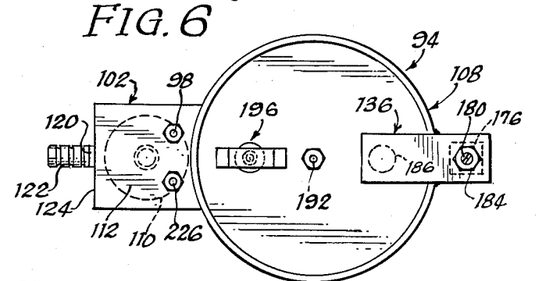
Fig. 6 is a top plan view of the pump of Fig. 5.

A rod 326 anchored to the solenoid bracket 328 and the tank body bottom 330 guides the float, which, with other parts of the lower structure of the pump, may be identical with and accordingly is numbered the same as the corresponding structure of Fig. 5. The float 190 of the form of the invention shown in Figs. 8 to 12 cooperates with the vacuum-breaker valve 304 in the same way in which the float of Fig. 5 cooperates with the vacuum-breaker valve 194. For convenience the binding posts 334 and 336 for the solenoid 262 may be provided at the tank top 276, and the various connections are made to complete the circuit as in the case of the pump 94.

With the arrangements thus far described, the pump 94 or 260 delivers a small quantity of oil to the crankcase 16 whenever the car is started (and until the engine suction has raised the float and thus opened the switch 50) notwithstanding that the crankcase oil is already at normal level. Under average driving conditions, where the starting of the car is relatively infrequent, the occasional slight amount of oil thus added to the crankcase will not lead to excessive raise in the oil level therein. However, in the case of a car which is frequently started and stopped, such, for example, as one engaged in house to house delivery, such frequent replenishment may in time fill the crankcase too full.

To obviate excessive filling of the crankcase 16, a switch tank construction may be employed such that the float switch 50 always remains open when the oil in the crankcase is at normal level, regardless whether the ignition switch 240 is open or closed. Such a construction is shown at 340 in Fig. 13, wherein a check valve 342 is provided in the engine suction line of the switch tank 344, for example as shown in the suction connector sleeve 346, said valve being operative, when the engine 10 is at rest, to close and thus prevent atmospheric air from entering the switch tank from the intake manifold 12, and, when the engine is running, to open and allow air from the switch tank to be drawn into the intake manifold. When the oil in the crankcase 16 is at normal level and the engine is running, the suction from the intake manifold maintains the float 348 in an elevated position so that the switch 50 remains open. Now when the engine 10 stops running, the suction of course stops and the check valve 342 automatically closes, with the result that the float 348 remains elevated due to the resulting vacuum in the upper part of the switch tank 344 and will not descend so long as the oil in the crankcase is at normal level. Thus the float switch 50 will be open when the ignition switch 240 is again closed, and the float switch will remain open until the oil in the crankcase descends to a level below normal, whereupon the crankcase air above such oil will pass through the dip tube hole 26 and escape and rise in the dip tube 24 and switch tank 344 and gradually break the vacuum in the upper part of the tank 344 and thus allow the float 348 to descend and close the float switch to operate the pump 94 or 196 as explained above. A fine orifice 350 is afforded in the suction sleeve 346, and the bottom sleeve connector 352 is adapted to be connected by the flexible tube 38 to the dip tube 24.

Figure 2:
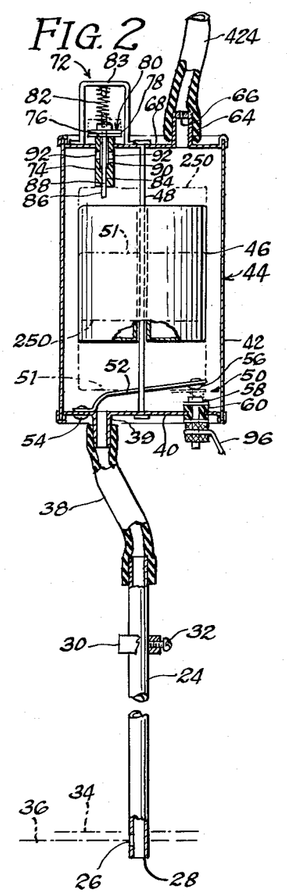
Fig. 2 is a schematic view, partly in section and partly in elevation, of the dip tube assembled with a float switch, pump, and oil reservoir in accordance with one form of the invention.
Figures 3, 9, 11, 12, 16:
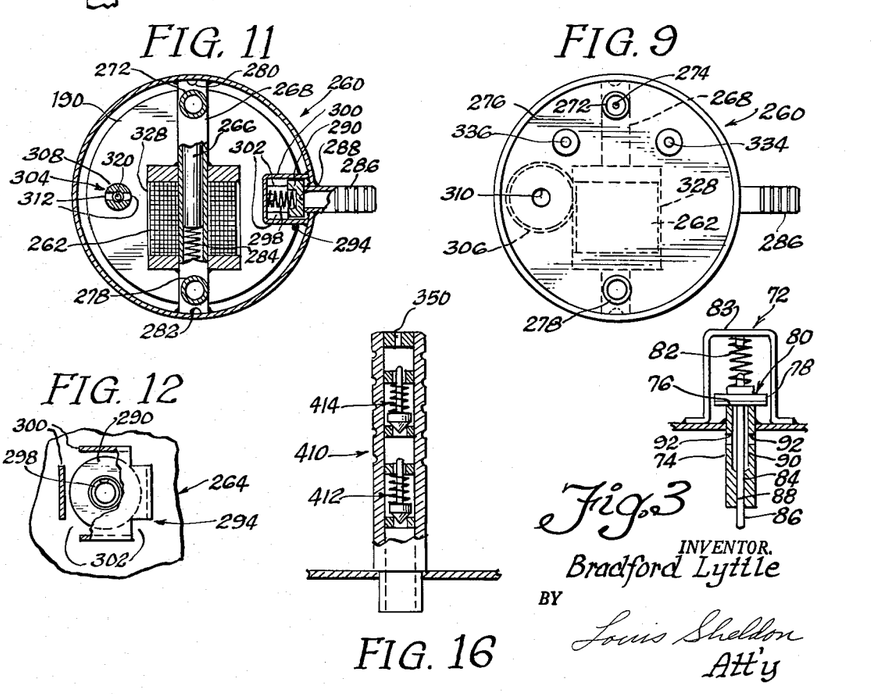
Fig. 3 is an enlargement of a portion of the vacuum-breaker valve of Fig. 2.
Fig. 9 is a top plan view of Fig. 8.
Figs. 10, 11, and 12 are views partly in section and partly in elevation, taken as indicated by the lines 10—10, 11—11, and 12—12, respectively, in Fig. 8.
Fig. 16 is an enlarged sectional view of a modification of the suction check valve shown in Fig. 13.
Figure 4:
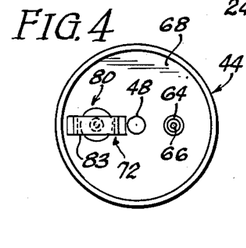
Fig. 4 is a top plan view of the float switch tank of Fig. 2.

In order to preclude oil from being drawn from the switch tank into the intake manifold, a vacuum-breaker valve such as that shown at 72 in Figs. 2 to 4 may be used, or this may be accomplished without such a valve by employing an arrangement in which the float, when at its zenith, closes the bottom of the suction sleeve connector. One such alternate arrangement is shown in Fig. 13, wherein the top 356 of the float, when at its zenith, closes the bottom 358 of the suction sleeve connector 346 to serve therewith as a check valve 360, which is held closed by the manifold suction when the crankcase oil level is normal.

Figures 13, 14, 15, 17, 18:
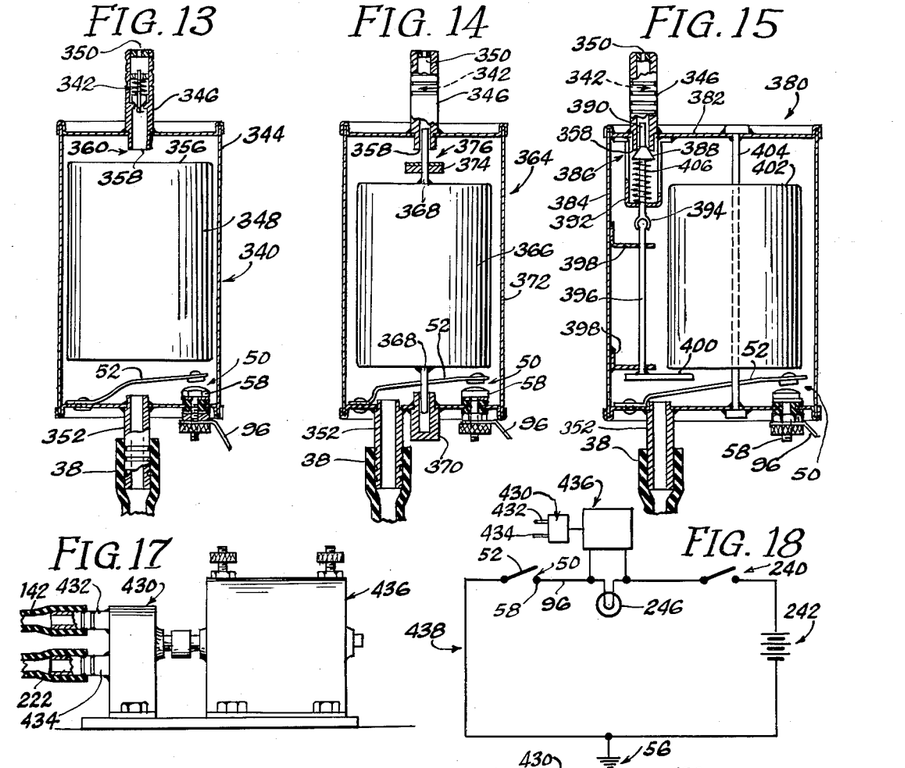
Figs. 13 to 15 show modifications of the switch tank assembly appearing in Fig. 2.
Fig. 17 shows a modified pump adapted for use in place of the solenoid-controlled pumps.
Fig. 18 is a diagram of an electric circuit adapted for use with the pump of Fig. 17.

Fig. 14 shows a similar switch tank structure 364 differing from Fig. 13 essentially in that the float 366 of Fig. 14 is guided by means of top and bottom pins 368 connected thereto and projecting respectively into the suction connector 346 and a bottom well 370 secured to the tank 372, and a collar 374, preferably leather-topped and secured about the upper pin, is the movable element of a valve 376 and adapted to engage the seat 358 at the bottom of the connector, the upper pin being clear of the check valve 342 at all times. If desired, the bottom of the well could be open and the sleeve 352 could be continuous therewith, and in such event the bottom of the can over the sleeve as presently located would be closed.

Another modification of Fig. 13 is shown at 380 in Fig. 15, wherein the suction connector 346 is mounted adjacent the periphery of the top 382 of the tank 384 and affords, at its bottom, within the tank, the seat 358 of a check valve 386 including a spring-pressed plug 388 cooperating with the seat. The plug 388 is attached to an intermediate part of a stem 390 guided by the connector 346 and by a bracket 392 attached to the tank. The stem 390 may be pivoted as at 394 to a rod 396 guided by brackets 398, attached to the tank 384, and a transverse bar or lug 400, attached to the rod, extends under the float 402, guided by a rod 404. The float 402 operates like the other switch floats, as explained above, to close the pump switch 50 when the crankcase oil descends below normal level and the engine is running, and, when the oil level is normal, and the engine is running, the valve spring 406 will close the valve 386 when the float has risen slightly above the level at which it allows the switch to open, thereby preventing escape of oil into the suction manifold. There the float will remain even after the engine stops running, and until the crankcase requires replenishment, whereupon the float will descend and open the check valve 386 and close the switch 50 as in the cases of the other switch floats. When, with the switch 50 closed, the engine is running, the pump will operate to replenish the crankcase 16.

Fig. 16 shows a modified suction check valve assembly 410 which may be desired to be used in place of that including the valve 342 of Fig. 13, to afford possibly greater assurance against leakage. The assembly 410 differs from that it is designed to replace essentially in that it includes a plurality of valves 412 and 414 in series instead of a single valve. Any air that may have leaked past the valve 414 will be stopped by the valve 412.

For connecting the switch tank and the pump tank to the suction manifold 12 in each of the arrangements referred to above, a Siamese coupling 420 may be employed, connected as by flexible tubing 422, 424, and 426 to the manifold, the switch tank, and the pump tank, respectively. Where the windshield wiper (not shown) is vacuum-driven, the Siamese coupling may be replaced by a cross-coupling (not shown) to afford a branch for connection to the wiper.

Instead of using a solenoid-controlled pump, I may employ a rotary or vibrating pump 430 (Figs. 17 to 19) of the vane or other suitable type, having an inlet 432, to be connected by the tubing 142, 144, 150, and 152 to the oil reservoir 156, and an outlet 434, to be connected by the tubing 222 and cap 20 to the filler opening 18 of the engine 10, and an electric motor 436 for driving the pump. The motor 436, when connected in series with the float switch 50 and ignition switch 240 as shown in the circuit 438 of Fig. 18 (with a tell-tale lamp 246 if desired), will drive the pump 430 to deliver oil to the crankcase 16 whenever the oil level in the crankcase drops below normal, as will be evident from the foregoing, and this arrangement will be generally satisfactory. Where, however, the car comes to a stop while the pump motor 436 is still operating, and the engine stops, but through inadvertence or for any other reason the ignition switch is not opened, the motor will continue to run until and after the reservoir is dry, with the crankcase flooded and oil "all over the place", and drain of the battery 242.

Figure 19:
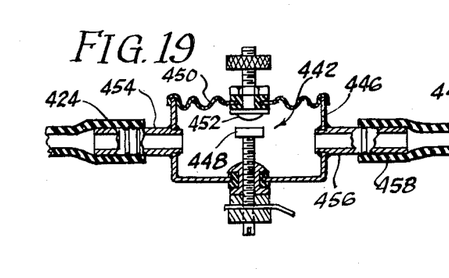
Fig. 19 is a sectional view of a diaphragm switch to take the place of the ignition switch.
Figure 20:
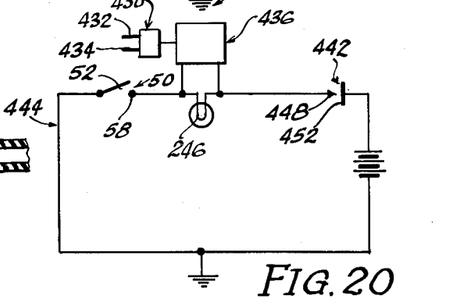
Fig. 20 is a diagram of an electric circuit including the pump of Fig. 17 and the diaphragm switch of Fig. 19.

Such a contingency may be guarded against by employment of an engine suction-controlled switch 442 (Fig. 19) in place of the ignition switch in the circuit, shown at 444 in Fig. 20, the switch 442 being closed only when the engine 10 is running. With this arrangement the motor 436 is independent of the ignition switch and will run only when the float switch 50 is closed while the engine is running.

The vacuum-operated switch 442 may be of the diaphragm type, comprising a cup 446 carrying an insulated fixed contact such as a binding post 448, a flexible diaphragm 450 sealed to the rim of the cup and carrying an insulated contact such as a binding post 452 movable therewith, the cup having tubular projections 454 and 456 adapted to be connected as by flexible tubing 424 and 458, respectively, to the intake manifold coupling 420 and the manifold suction tubular connector of the switch tank.

The collar 30 may be initially fixed to the tube 24 but is preferably adjustably therealong so that one length of such tube may be adaptable to various engines.

Of course, due to the sloshing of the oil in the crankcase 16, the dip tube hole 26 may from time to time be momentarily uncovered by the oil, and at such times decent of the switch float 46 may be initiated, but the concomitant closing of the hole will produce the condition under which the switch float will rise before it can close the switch 50. Also, theoretically the general level of the oil in the crankcase may descend so that it minutely uncovers the dip tube hole 26 and thus even the slight amount of oil entering the crankcase due to slight descent of the switch float would raise the oil level sufficiently to cover the hole. In practice, it is found that the pump is idle for substantial periods of time and is running for substantial periods of time.

The larger bore diameter of the vacuum-breaker valve sleeve should be sufficiently greater than the valve stem diameter to permit adequate passage of air for prompt breaking of the vacuum, yet small enough so that the suction on the valve head will be insufficient, when combined with the valve head spring pressure, to prevent the rising float from opening the valve. In one installation I have found satisfactory, the larger sleeve bore and stem diameters for the switch tank vacuum breaker valve were .085" and .040", respectively, and for the pump tank vacuum breaker valve were .250" and .040", respectively.

The diameter of the switch tank suction orifice 66 (Figs. 2 and 4) is a factor affecting the rapidity of opening and closing of the switch 50. Whenever the engine is started while the crankcase oil level is normal (and also whenever the crankcase oil level becomes normal), prompt opening of the switch 50 (and thus stopping of the pump) is of course desirable, and for this purpose the larger the orifice diameter, the better. Whenever the crankcase oil level becomes subnormal, prompt closing of the switch 50 (and thus starting of the pump) is of course desirable, and for this purpose the smaller the orifice diameter, the better. It is accordingly apparent that there is a degree of latitude within which a suitable orifice diameter may be selected. Care should be taken, however, that too large an orifice diameter is avoided. An orifice diameter will be too large if by reason thereof, when the crankcase oil level is subnormal, the air from the crankcase does not bubble up in the dip tube 24 but instead flows in a continuous stream so that no or substantially no oil flows out of the dip tube into the crankcase. In one installation I have found satisfactory, the orifice diameter was about .013", using a dip tube with an interior diameter of about .190".

The diameter of the pump tank suction orifice 126 (Fig. 5), 274 (Figs. 8 and 9) is a factor affecting the working intervals of the pump. If the orifice diameter is relatively large, the pump will replenish the crankcase more rapidly; if the orifice diameter is relatively small, the crankcase will be replenished more slowly. In an installation I have found satisfactory, the orifice diameter was about .040".

As noted above, with the switch tank of Figs. 2 and 3, the switch 50 is closed when the driver closes the ignition switch preparatory to starting the engine, so that even though the crankcase oil level is normal, the pump delivers an unneeded quantity of oil to the crankcase, so that the desirability of rapid opening of the switch under such circumstances is evident, particularly in the case of an engine which is frequently started and stopped. With the switch tanks of Figs. 13 to 15, this is no problem, as noted above. Speed of opening of the switch 50 in Figs. 13 to 15 being of less apparent importance than the speed of closing of the switch, the selection of a smaller diameter for the orifice 350 to insure rapid closing of the switch at the expense of the speed of opening of the switch is indicated, care being taken, however, in such selection, to afford a satisfactory switch-opening speed.

Various changes may be made and modifications resorted to without departing from the spirit of the invention. Hence I do not wish to be restricted to the forms of the invention illustrated and described or the uses mentioned except to the extent indicated in the appended claims, which are to be interpreted as broadly as the state of the art will permit.

I claim:

1. In combination with an ignition switch, an internal combustion engine having a crankcase, a dipstick hole, an oil filler hole, and an intake manifold: apparatus for maintaining the oil in the crankcase at optimum level, said apparatus comprising a float tank, means for establishing communication between the upper interior of said tank and the intake manifold, a vacuum-breaker valve carried by the upper part of said tank and, when open, establishing communication between the upper interior of said tank and the atmosphere, a float in said tank, said valve being arranged to be opened pursuant to elevation of said float and being biased closed when said float descends, a dip tube depending from said tank and adapted to extend down through the dipstick hole and into the crankcase, means on said tube for limiting the extent of projection of said tube in the crankcase, said tube having a hole through its wall, said tube hole being located so that, when said tube is fully lowered into the crankcase, the top of said hole is substantially at optimum level of oil in the crankcase, an electric switch arranged to be closed upon substantially complete descent of said float and to be open when said float is elevated, said switch including a movable contact member and a stationary contact carried by said tank, a motor connected at one terminal to said contact and adapted at its other terminal to be connected to the ignition switch, a pump controlled by said motor and having an inlet adapted to be connected to an oil reservoir and an outlet adapted to be connected to the oil filler hole in the engine, whereby when the ignition switch is connected in a circuit in series with said motor and float switch, and the engine is running and the level of oil in the crankcase is above said tube hole, said float hovers at its upper limit of movement by reason of the alternate conditions of vacuum and non-vacuum resulting from alternate closing and opening of said valve by said float, so that said float switch is opened and hence said motor is de-energized, and, when the engine is running and the level of oil in the crankcase falls below the top of said tube hole, air from above the crankcase oil is drawn up said tube and into said tank and the oil gravitates into the crankcase from said tank and tube, whereupon the descending float closes said float switch with the result that said motor is energized, enabling the pump to replenish the crankcase with oil from said reservoir until the crankcase oil level rises above the top of said tube hole, the suction then becoming operative to raise said float and thus open the float switch and thereby de-energize said motor.

2. A motor vehicle including an internal combustion engine, a readily purchaseable can of oil of sufficient capacity to lubricate the average engine for thousands of miles of vehicle travel but of too great a capacity to fit under the hood of the vehicle, said can being secured upright in the trunk compartment of the vehicle, the cap of the can having a puncture, tubing projecting through said cap substantially to the bottom of said can, the interior of said can communicating with the atmosphere, a pump mounted in the vehicle and having an inlet connected to said tubing and having an outlet, the engine having an oil filter hole and a breather cap therefor, said breather cap having a puncture, tubing extending from said outlet and down through said breather cap puncture, a motor for said pump, a float tank communicating at the top thereof with the engine intake manifold, tubing extending from said tank through the dipstick hole and into the crankcase and open at its lower end and having a transverse hole through the wall thereof and so located that said hole is covered by the crankcase oil when such oil is at optimum level, an electric switch comprising a spring-biased contact arm arranged to be flexed by the float upon descent of the float, said switch also comprising a stationary contact disposed in the path of such flexure of said arm and engaged by said arm upon such flexure thereof, a vacuum-breaker valve mounted at the top of said tank and, when open, establishing communication between the atmosphere and the upper interior of said tank, said valve including a movable member biased toward valve-closing position by a spring and adapted to be opened by the float when the float is elevated, and a series circuit including the ignition switch, said float switch, the vehicle battery, and said motor.

3. Apparatus for maintaining liquid in a container open to the atmosphere at a predetermined substantially constant level, said apparatus comprising a float tank, a tube depending from said tank into said container and having a lateral hole therethrough, the liquid at said level covering said hole, means for forming a vacuum in the upper interior of said tank, a vacuum-breaking valve in the upper part of said tank and arranged to be opened by the float when the float is elevated and biased closed when the float is down, a reservoir for liquid, a pump between and connected to said reservoir and the container, a motor for said pump, and an electric circuit including an electric current source and a switch controlling said motor, said switch comprising a stationary contact within said tank and a movable contact member spring-biased away from said contact, said contact member being arranged to be moved by the float into engagement with said contact as the float completes its descent, and to move out of such engagement as the float commences to rise, whereby, when the level of the liquid in said container is above the top of said hole, liquid is drawn from the container into the tube and tank and raises the float so that first said switch is opened and then said float opens the valve, whereupon the float hovers at its upper limit, and when the level of liquid in said container drops below the top of said hole, the liquid in said tank and tube descends into the container whereupon said float closes said switch and thus said motor and pump operate to replenish the container with liquid from said reservoir.

4. An internal combustion engine having an oil filler hole, an oil reservoir, a pump having an inlet communicating with said reservoir and an outlet communicating with said filler hole, a motor controlling said pump, a float tank, suction means associated with the engine and communicating with the upper interior of said tank, a dip tube depending from said tank and into the engine crankcase, said tube having a side opening, the crankcase oil at optimum level covering said opening, an electric switch mounted in said tank and arranged to be open when said float is elevated and to be closed by said float upon descent of said float, means associated with said tank for substantially preventing said suction means from drawing oil from said tank into said suction means, and means including said switch for operating said motor when the level of oil in the crankcase is below the top of said tube opening to enable said pump to deliver oil from said reservoir to the crankcase.

5. An internal combustion engine having an oil filler hole, an oil reservoir, a pump having an inlet communicating with said reservoir and an outlet communicating with said filler hole, a motor controlling said pump, a float tank, suction means associated with the engine and communicating with the upper interior of said tank, a dip tube depending from said tank and into the engine crankcase, said tube having a side opening, the crankcase oil at optimum level covering said opening, an electric switch mounted in said tank and arranged to be open when said float is elevated and to be closed by said float upon descent of said float, a vacuum-breaker valve including a movable element biased to valve-closing position and movable to open position by said float as said float is raised by crankcase oil drawn by said suction means into said tank, and means including said switch for operating said motor when the level of oil in the crankcase is below the top of said tube opening to enable said pump to deliver oil from said reservoir to the crankcase.

6. An internal combustion engine having an oil filler hole, an oil reservoir, a pump having an inlet communicating with said reservoir and an outlet communicating with said filler hole, a motor controlling said pump, a float tank, suction means associated with the engine and communicating with the upper interior of said tank, a dip tube depending from said tank and into the engine crankcase, said tube having a side opening, the crankcase oil at optimum level covering said opening, an electric switch mounted in said tank and arranged to be open when said float is elevated and to be closed by said float upon descent of said float, a valve controlling the suction and including a seat on said suction means and a closure therefor at the top of said float so that said valve is closed when said float is fully raised and opened upon descent of said float, and means including said switch for operating said motor when the level of oil in the crankcase is below the top of said tube opening to enable said pump to deliver oil from said reservoir to the crankcase.

7. An internal combustion engine having an oil filler hole, an oil reservoir, a pump having an inlet communicating with said reservoir and an outlet communicating with said filler hole, a motor controlling said pump, a float tank, suction means associated with the engine and communicating with the upper interior of said tank, a dip tube depending from said tank and into the engine crankcase, said tube having a side opening, the crankcase oil at optimum level covering said opening, an electric switch mounted in said tank and arranged to be open when said float is elevated and to be closed by said float upon descent of said float, a valve controlling the suction and including a seat on said suction means and a closure therefor at the top of said float so that said valve is closed when said float is fully raised and opened upon descent of said float, a check valve over said seat, said check valve being held open by the intake manifold suction and closed in the absence of intake manifold suction, and means including said switch for operating said motor when the level of oil in the crankcase is below the top of said tube opening to enable said pump to deliver oil from said reservoir to the crankcase.

8. An internal combustion engine having an oil filler hole, an oil reservoir, a pump having an inlet communicating with said reservoir and an outlet communicating with said filler hole, a motor controlling said pump, a float tank, suction means associated with the engine and communicating with the upper interior of said tank, a dip tube depending from said tank and into the engine crankcase, said tube having a side opening, the crankcase oil at optimum level covering said opening, an electric switch mounted in said tank and arranged to be open when said float is elevated and to be closed by said float upon descent of said float, a check-valve associated with said suction means and operative to prevent flow from said suction means to said tank when said suction means is inoperative, and means including said switch for operating said motor when the level of oil in the crankcase is below the top of said tube opening to enable said pump to deliver oil from said reservoir to the crankcase.

9. In a mechanism including an electric motor for operating a pump to replenish an internal combustion engine crankcase with oil, a float tank having means for connecting the upper interior of said tank to the engine intake manifold, a tube communicating with and depending from the lower part of said tank and having a lateral opening therethrough and adapted to project down into the crankcase so that said opening is covered by the crankcase oil when such oil is at optimum level, an electric switch for controlling the motor, said switch being mounted in said tank and being closed by the float when the float is in a lower position and being open when the float is in a raised position, and means supported by said tank for preventing escape of oil to the intake manifold.

10. In a mechanism including a pump motor for replenishing an internal combustion engine crankcase with oil, a control for the motor, said control comprising a float tank having means for connecting the upper interior of said tank to the engine intake manifold, a tube communicating with the lower interior of said tank and having a lateral opening therethrough and adapted to pass down through the dipstick hole and into the crankcase to a depth such that when the oil in the crankcase is at optimum level it covers said opening, an electric switch for controlling the motor, said switch comprising a pair of contacts, one of said contacts being biased away from the other, said biased contact being disposed in the path of descent of the float so as to be moved by the float into engagement with said other contact, and a vacuum-breaking valve mounted on the upper part of said tank and including a movable member biased to closed position, said movable member being disposed in the path of ascent of said float so as to be moved to open position by said float when said switch is open.

11. In a mechanism including a pump motor for replenishing an internal combustion engine crankcase with oil, a control for the motor, said control comprising a float tank having means for connecting the upper interior of said tank to the engine intake manifold, a tube communicating with the lower interior of said tank and having a lateral opening therethrough and adapted to pass down through the dipstick hole and into the crankcase to a depth such that when the oil in the crankcase is at optimum level it covers said opening, an electric switch for controlling the motor, said switch comprising a pair of contacts, one of said contacts being biased away from the other, said biased contact being disposed in the path of descent of the float so as to be moved by the float into engagement with said other contact, and interengageable means on said tank and float adapted to be interengaged when said float is at its zenith for preventing flow of air from the intake manifold to said tank when the crankcase oil is at optimum level and the engine stops.

12. In a mechanism including a pump motor for replenishing an internal combustion engine crankcase with oil, a control for the motor, said control comprising a float tank having means for connecting the upper interior of said tank to the engine intake manifold, a tube communicating with the lower interior of said tank and having a lateral opening therethrough and adapted to pass down through the dipstick hole and into the crankcase to a depth such that when the oil in the crankcase is at optimum level it covers said opening, an electric switch for controlling the motor, said switch comprising a pair of contacts, one of said contacts being biased away from the other, said biased contact being disposed in the path of descent of the float so as to be moved by the float into engagement with said other contact, and a check-valve mounted in said means and arranged to prevent flow of air from the intake manifold to said tank when the engine stops.

13. In a mechanism including a pump motor for replenishing an internal combustion engine crankcase with oil, a control for the motor, said control comprising a float tank having means for connecting the upper interior of said tank to the engine intake manifold, a tube communicating with the lower interior of said tank and having a lateral opening therethrough and adapted to pass down through the dipstick hole and into the crankcase to a depth such that when the oil in the crankcase is at normal level it covers said opening, an electric switch for controlling the motor and arranged to be opened upon ascent of the float and to be closed when the float is at its bottom position, and a check valve for closing said connecting means when said float is elevated, said valve comprising a movable member biased to valve-closing position and means projecting from said member into the path of descent of said float and engageable by said float to open said valve, said member being biased closed when said float has ascended sufficiently to allow said switch to open.

14. A pump for replenishing an internal combustion engine crankcase with oil, said pump comprising a float tank having an inlet adjacent the top thereof adapted to be connected to an oil reservoir and an outlet adjacent the bottom thereof adapted to be connected to the oil filler opening of the engine, a vacuum-breaker valve mounted at the upper part of said tank and comprising a movable member biased down to valve-closing position, said member being disposed in the path of ascent of the float so as to be raised to open position by said float and thus establish communication between the atmosphere and the upper interior of said tank, a valve assembly supported by said tank and including a solenoid and a reciprocable armature core biased in one direction, a tube guiding said core, said tube extending substantially beyond the ends of said solenoid, the end portions of said tube selectively communicating with the upper interior of said tank according as said solenoid is energized or de-energized and consequently according as said core is in one or the other of its limits, one end portion of said tube communicating with the atmosphere when it communicates with said tank, means for establishing communication between the other end portion of said tube and the intake manifold of the engine when said other portion of said tube communicates with said tank, and a check-valve at the bottom of said tank and arranged to be opened by oil flowing from said tank to said outlet and to be closed by suction when the intake manifold is in communication with said tank.

15. In a pump for replenishing the crankcase of an internal combustion engine with oil, a float tank having an inlet adapted to be connected to an oil reservoir and an outlet adapted to be connected to the oil filler hole of the engine, means for connecting the upper interior of said tank with the engine intake manifold, means for connecting the upper interior of said tank with the atmosphere, means including a movable member rendering the first two means selectively inoperative, a vacuum-breaker check valve which, when open, establishes communication between the atmosphere and the upper interior of said tank, said check valve being arranged to be opened pursuant to rise of the float and to automatically close pursuant to descent of the float, and a check valve mounted at the bottom of said tank, the second check valve being arranged to be opened by the oil gravitating from said tank to permit said oil to pass into said outlet and to be closed by the suction from the intake manifold.

16. In a pump for replenishing the crankcase of an internal combustion engine with oil, a float tank having an inlet adapted to be connected to an oil reservoir and an outlet adapted to be connected to the oil filler hole of the engine, means for connecting the upper interior of said tank with the engine intake manifold, means for connecting the upper interior of said tank with the atmosphere, means including a movable member rendering the first two means selectively inoperative, a vacuum-breaker check valve which, when open, establishes communication between the atmosphere and the upper interior of said tank, said check valve being arranged to be opened pursuant to rise of the float and to automatically close pursuant to descent of the float, and a check valve mounted at the bottom of said tank, the second check valve being arranged to be opened by the oil gravitating from said tank to permit said oil to pass into said outlet and to be closed by the suction from the intake manifold, said vacuum-breaker valve comprising a movable member and a spring pressing said member down toward valve-closing position, said member having a depending stem in the path of rise of said float, whereby opening of said vacuum-breaker valve is delayed until the buoyant force exerted on said stem by said float overbalances the combined pressure of said spring and the force of the suction on said member, whereupon said member pops open, breaking the vacuum in said tank so that the oil may gravitate from said tank.

17. Apparatus for maintaining the oil in an internal combustion engine crankcase at optimum level, said apparatus comprising a pump having an inlet adapted to be connected to an oil reservoir to receive oil therefrom and an outlet adapted to be connected to the crankcase oil filler opening of such an engine to deliver oil to such opening, means for rendering said pump operative when the crankcase oil is below optimum level and for rendering said pump inoperative when the crankcase oil is at optimum level, and means including a pair of pump controlling devices effective to render said pump operative only when both of said devices are in operative condition, the second means also including a hollow member containing said devices and adapted to be placed in communication with the intake manifold and with the interior of the crankcase, one of said devices being responsive to suction in the intake manifold and operative when the engine is running and inoperative when the engine is not running, the other device being responsive to the crankcase oil level and to the suction in the intake manifold and being operative when the crankcase oil is below optimum level and inoperative when the crankcase oil is at optimum level.

18. Apparatus for maintaining the oil in an internal combustion engine crankcase at optimum level, said apparatus comprising a pair of control devices, one of said devices being responsive to the pressure in the engine intake manifold and being operative only when the engine is running, the other device being responsive to the crankcase oil level and being operative when the crankcase oil is below optimum level and inoperative when the crankcase oil is at optimum level and the engine is running, and means responsive only to joint operation of said devices for replenishing the crankcase.

19. Apparatus for maintaining the oil in an internal combustion engine crankcase at normal level, said apparatus comprising a switch responsive to the pressure in the engine intake manifold and being closed only when the engine is running and open only when the engine is not running, a switch responsive to the crankcase oil level and being closed when the crankcase oil is below normal level and open when the crankcase oil is at normal level and the engine is running, and means comprising a series circuit including a motor and said switches for replenishing the crankcase.

20. Apparatus for raising the oil in an internal combustion engine crankcase to normal level when the engine is running, said apparatus comprising means for delivering oil from a reservoir to the crankcase oil filler hole, and mechanism for controlling the operation of said means, said mechanism comprising second and third means, said second means being operative only pursuant to and concurrently with the running of the engine and said third means being operative when the crankcase oil level is below normal and the engine is running and inoperative when the crankcase oil level is normal, said mechanism rendering the first means operative when said second and third means are simultaneously operative and said mechanism rendering said first means inoperative when at least one of said second and third means is inoperative.

References Cited in the file of this patent

UNITED STATES PATENTS

| | | |
|---|---|---|
| 1,485,729 | Sommerfeldt | Mar. 4, 1924 |
| 2,316,000 | James | Apr. 6, 1943 |
| 2,615,442 | Berry | Oct. 28, 1952 |